United States Patent [19]
Hsieh et al.

[11] 3,880,955
[45] Apr. 29, 1975

[54] LACTONE-CONTAINING POLYMERS

[75] Inventors: Henry L. Hsieh; Ollie G. Buck, both of Bartlesville, Okla.

[73] Assignee: Phillips Petroleum Company, Bartlesville, Okla.

[22] Filed: Apr. 16, 1973

[21] Appl. No.: 351,436

Related U.S. Application Data

[63] Continuation-in-part of Ser. No. 147,709, May 27, 1971, abandoned.

[52] U.S. Cl. ................. 260/887; 260/874; 260/892
[51] Int. Cl. .......................... C08d 9/08; C08f 29/12
[58] Field of Search ............ 260/879, 887, 880, 892

[56] References Cited
UNITED STATES PATENTS

| | | | |
|---|---|---|---|
| 3,557,255 | 1/1971 | Skarkay | 260/887 |
| 3,637,554 | 1/1972 | Childers | 260/879 |
| 3,642,717 | 2/1972 | Peterson et al. | 260/887 |

*Primary Examiner*—Murray Tillman
*Assistant Examiner*—J. Ziegler

[57] ABSTRACT

A polyaziridinyl compound having at least two aziridinyl groups per molecule is employed in producing lactone copolymers from a base polymer and a lactone monomer.

10 Claims, No Drawings

LACTONE-CONTAINING POLYMERS

This application is a continuation-in-part of application Ser. No. 147,709, filed May 27, 1971, now abandoned.

This invention relates to the production of lactone-containing block polymers.

In one of its more specific aspects, this invention relates to the preparation of lactone copolymers.

The preparation of lactone-containing block polymers is well known. Some of these are thermoplastic resinous materials, such materials including polystyrene-polylactone block copolymers. Others are thermoplastic elastomer types which are generally characterized by a central rubbery block or segment and at least one terminal block or segment derived from the ring-opening of the lactone. A preferred rubbery polymer of the latter type is a polystyrene-polybutadiene-polylactone block copolymer. It has now been discovered that polyfunctional aziridinyl compounds can be employed as "adjuvants" or "cocatalysts" in the preparation of such lactone-containing block polymers. This invention provides that method and the polymers produced thereby.

According to an embodiment of this invention there is provided a method of producing lactone copolymers comprising the reaction product of a base polymer and a lactone monomer which comprises contacting the base polymer with a lactone monomer and with a polyaziridinyl compound having at least two aziridinyl groups per molecule under conditions to react the lactone monomer with the base polymer.

Lactone copolymers such as are herein concerned are of the general nature of those described in application Ser. No. 883,986, filed Dec. 10, 1969, now U.S. Pat. No. 3,598,799 to Naylor, the disclosure of which is incorporated by reference. Such lactone copolymers generally are prepared by contacting a base polymer having at least one $$(- \overset{|}{\underset{|}{C}} - \text{alkali metal})$$

group with a lactone monomer employing as the catalyst an alkyl compound containing the alkali metal, one such alkyl compound being butyllithium. This process is carried out at temperatures from about −20° to about 200°C during periods of up to about two hours in the presence of a diluent. The present invention, except as to the employment of the polyaziridinyl compound, is carried out under comparable conditions, all of which are defined in the prior art.

The base polymer can be formed in any conventional manner with any known monomer or combination of monomers so long as the resulting polymer molecules contain the required $$- \overset{|}{\underset{|}{C}} - \text{alkali metal}$$

group. The base polymer molecules can contain one or more of these groups depending upon the method by which the base polymer is formed. Monomers selected from the group consisting of conjugated dienes having from about 4 to about 12 carbon atoms per molecule and monovinyl-substituted hydrocarbon aromatic compounds having from about 8 to 12 carbon atoms per molecule can be employed. Suitable conjugated dienes include 1,3-butadiene, isoprene, piperylene, 6-phenyl-1,3-hexadiene, and the like. Suitable monovinyl-substituted aromatic hydrocarbon compounds include styrene, alpha-methylstyrene, 4-methylstyrene, 4-isopropylstyrene, 2,4-dimethylstyrene, 1-vinylnaphthalene, 2-vinylnaphthalene, alkyl derivatives thereof, and the like. The base polymer can be a homopolymer of a conjugated diene or a monovinyl-substituted aromatic hydrocarbon compound or a random or block copolymer of two or more conjugated dienes or two or more monovinyl-substituted aromatic hydrocarbon compounds or a mixture of at least one conjugated diene and at least one monovinyl-substituted aromatic hydrocarbon compound.

These monomers can be polymerized using organoalkali metal compounds as initiators. A preferred initiator is that which corresponds to the formula $R'Li_x$, wherein $R'$ is a hydrocarbon radical selected from the group consisting of aliphatic, cycloaliphatic, and aromatic radicals and combinations thereof, and $x$ is an integer from 1 to 4, inclusive. The $R'$ in the formula has a valence equal to the integer $x$, and preferably contains from about 1 to 20 carbon atoms, although it is within the scope of this invention to use higher molecular weight compounds. It is preferred that the initiators be alkyllithium compounds. If n-alkyllithium compounds are employed it is desirable that a small amount of a polar compound such as tetrahydrofuran be employed in order to accelerate the rate of initiation. When forming the base polymer in situ using an organoalkali metal initiator, the amount of initiator employed is generally in the range of from about 0.5 to about 20, preferably from about 1 to about 6, gram millimoles of initiator per 100 grams of monomers to be polymerized to form the base polymer. Examples of suitable polymerization initiators include methyllithium,
isopropyllithium,
n-butyllithium,
tert-octyllithium,
n-decyllithium,
phenyllithium,
1-naphthyllithium,
4-butylphenyllithium,
p-tolyllithium,
4-phenylbutyllithium,
cyclohexyllithium,
4-butylcyclohexyllithium,
4-cyclohexylbutyllithium,
dilithiomethane,
1,4-dilithiobutane,
1,10-dilithiodecane,
1,20-dilithioeicosane,
1,4-dilithio-2-butene,
1,8-dilithio-3-decene,
1,4-dilithiobenzene,
1,5-dilithionaphthalene,
1,2-dilithio-1,2-diphenylethane,
9,10-dilithio-9,10-dihydroanthracene,
1,2-dilithio-1,8-diphenyloctane,
1,3,5-trilithiopentane,
1,5,15-trilithioeicosane,
1,3,5-trilithiocyclohexane,
1,2,5-trilithionaphthalene,
1,3,5-trilithioanthracene, 1,3,5,8-tetralithiodecane,
1,5,10,20-tetralithioeicosane,
1,2,3,5-tetralithiocyclohexane,
1,2,3,5-tetralithio-4-hexylanthracene,
dilithio adducts of 2,3-dialkyl-1,3-butadiene, preferably the dilithium adducts of 2,3-dimethyl-1,3-butadiene and dilithium adducts of butadiene and isoprene containing from 1 to 10 diene units per molecule, and the like. The polymerization procedures for the above monomers and initiators are well known and therefore will not be described here in detail, but suitable procedures can be found in British Patent Nos. 817,693, and 888,624, and U.S. Pat. No. 2,975,160; their disclosures are hereby incorporated herein by reference.

Preformed base polymers of various monomers including the conjugated dienes and monovinyl-substituted aromatic compounds disclosed hereinabove can be converted to a polymer containing the requisite

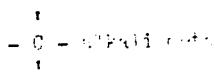

groups by other procedures known in the art. For example, a hydrocarbon polymer (e.g., polybutadiene) containing either allylic or benzylic hydrogen atoms can be metallated with an alkyllithium compound (e.g., n-butyllithium) by reacting the polymer with the alkyllithium at a temperature in the range of 25°–200°C for from 2 minutes to 50 hours thereby providing base polymer having one or more intermediate

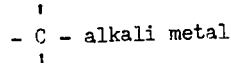

groups per polymer molecule.

A suitable method for metallating a hydrocarbon polymer is disclosed in U.S. Pat. No. 3,492,369, which is herein incorporated by reference.

The base polymer can be contacted with any lactone or mixtures of lactones that will undergo a ring opening polymerization. Suitable lactones include at least one lactone of the formula

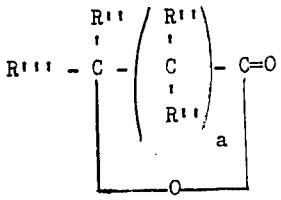

wherein R''' is one of hydrogen and a radical of the formula

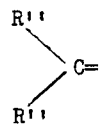

and when R''' is a radical as specified no R'' is attached to the carbon atom to which the radical is attached, where R'' is one of hydrogen, alkyl, cycloalkyl, alkenyl, cycloalkenyl, and aryl and combinations thereof such as alkaryl, wherein the total carbon atoms in the R'' and R''' substituents being in the range of 1 to 12, and wherein a being an integer which can be 1, 3 or 4.

Suitable lactones include
beta-propiolactone,
delta-valerolactone,
epsilon-captrolactone,
and lactones corresponding to the following acids;
2-methyl-3-hydroxypropionic acid,
3-hydroxynonanoic or 3-hydroxypelargonic acid,
2-dodecyl-3-hydroxypropionic acid,
2-cyclopentyl-3-hydroxypropionic acid,
3-phenyl-3-hydroxypropionic acid,
2-naphthyl-3-hydroxypropionic acid,
2-n-butyl-3-cyclohexyl-3-hydroxypropionic acid,
2-phenyl-3-hydroxytridecanoic acid,
2-(2-methylcyclopentyl)-3-hydroxypropionic acid,
2-(4-methylphenyl)-3-hydroxypropionic acid,
3-benzyl-3-hydroxypropionic acid,
2,2-dimethyl-3-hydroxypropionic acid,
2-methyl-5-hydroxyvaleric acid,
3-cyclohexyl-5-hydroxyvaleric acid,
4-phenyl-5-hydroxyvaleric acid,
2-heptyl-4-cyclopentyl-5-hydroxyvaleric acid,
2-methyl-3-phenyl-5-hydroxyvaleric acid,
3-(2-cyclohexylethyl)-5-hydroxyvaleric acid,
4-benzyl-5-hydroxyvaleric acid,
3-ethyl-5-isopropyl-6-hydroxycaproic acid,
2-cyclopentyl-4-hexyl-6-hydroxycaproic acid,
3-phenyl-6-hydroxycaproic acid,
3-(3,5-diethylcyclohexyl)-5-ethyl-6-hydroxycaproic acid,
4-(3-phenylpropyl)-6-hydroxycaproic acid,
2-benzyl-5-isobutyl-6-hydroxycaproic acid,
7-phenyl-6-hydroxy-6-octenoic acid,
2,2-dipropenyl-5-hydroxy-5-heptenoic acid,
2,2-di(1-cyclohexenyl)-5-hydroxy-5-heptenoic acid,
2,2-dimethyl-4-propenyl-3-hydroxy-3,5-heptadienoic acid,
and the like.

The present invention employs a polyaziridinyl compound having at least two aziridinyl groups per molecule, these groups being represented by the formula

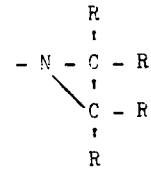

in which each R can be hydrogen, alkyl, aryl, or cycloalkyl radicals or composites thereof such as alkaryl, the total of the R groups containing up to about 20 carbon atoms. The aziridine rings can be attached to a carbon, phosphorous or sulfur atom. Examples of such materials are triaziridinyl phosphine oxides or sulfides such as tri(1-aziridinyl)phosphine oxide, tri(2-ethyl-3-decyl-1-aziridinyl)-phosphine sulfide, tri(2-phenyl-1-aziridinyl)phosphine oxide, tri(2-methyl-3-cyclohexyl-1-aziridinyl)phosphine, triaziridinyl-substituted triazines and the triphosphatriazines containing from about 2 to about 6 aziridinyl substituted rings such as 2,4,6-tri(aziridinyl)-1,3,5-triazine, 2,4,6-tri(2-methyl-1-aziridinyl)-1,3,5-triazine, 2,4,6-tri(1-aziridinyl)-2,4,6-triphospha-1,3,5-triazine, and the like. Additional examples of suitable compounds are set forth in U.S. Pat. No. 3,177,190, column 8, line 30 to column 9, line 75. Hereinafter, the invention will be illustrated employing tri(2-methyl-1-aziridinyl)phosphine oxide without meaning to limit the invention thereto.

The polyaziridinyl compound which is employed, in terms of the ratio of equivalents of the alkali metal initiator, which is most frequently lithium, to equivalents of the aziridinyl groups in the polyaziridinyl compound, is in the range of from about 1 to about 0.5 to about 1 to about 50. However, best results are obtained at a ratio of equivalents from about 1 to 1 to about 1 to 4.

The reaction conditions under which the polyaziridinyl compounds are employed are substantially those conventionally employed in monomer polymerization, involving lactone polymerization. Such polymerizations are described in U.S. Pat. Nos. 3,585,257 and 3,639,519, for example, the disclosures of which are herein incorporated by reference. Generally, the lactone monomer is added to a polymerization mixture after initiation with an organolithium initiator, the mixture containing the base polymer being contacted with an oxygenated compound prior to addition of the lactone. A small amount of the lactone, itself, can be used as the oxygenated additive prior to the addition of the major amount of the lactone monomer.

The polyaziridinyl compound can be added with that major amount of the lactone in the lactone incorporation step but best results are obtained when the polyaziridinyl compound is added to the polymerization mixture after the lactone monomer has been substantially completely polymerized. It is also within the scope of this invention to add the polyaziridinyl compound to the polymerization mixture, either continuously or intermittently, during the lactone polymerization step.

The temperature employed during the polymerization will be from about $-20°$ to about $200°C$ with best results being obtained at a temperature within the range of from about $5°$ to about $100°C$. The time required will depend upon the mode of adding the polyaziridinyl compound to the polymerization mixture; if the polyaziridinyl compound is added with the lactone, the time employed will be about the same as that employed for the lactone polymerization step. When the polyaziridinyl compound is added during the lactone polymerization or after the substantially complete polymerization of the lactone, the time employed will generally be within the range of 5 minutes to 3 hours.

The lactone block copolymers produced by the method of this invention can be isolated or recovered from the polymerization mixture by those means conventionally employed. When the lactone block copolymer is of the type which contains carbon-carbon unsaturation as, for example, from the use of a conjugated diene comonomer, an antioxidant is generally added to the polymerization mixture prior to the recovery of the polymer. Conventional polymer recovery procedures include steam stripping of the reaction mixture, coagulation of the polymerization mixture with a polymer nonsolvent and evaporation of the polymerization diluent and excess liquid monomers.

The materials produced by this invention have utility in a wide variety of applications. For example, materials produced from rubbery lactone block copolymers can be used to make tubing, film and shoe soles. Materials produced from plastic lactone block copolymers can be employed in the fabrication of film, pipe and molded articles.

EXAMPLE I

The method of this invention is illustrated by the following series of runs in which various amounts of tri(2-methyl-1-aziridinyl)phosphine oxide were employed in the preparation of (polystyrene)-(polybutadiene)-(poly-$\epsilon$-caprolactone) block polymers. The following polymerization recipe was employed in each run:

| Step 1 | Parts by Weight |
|---|---|
| Cyclohexane | 780 |
| Tetrahydrofuran | 0.05 |
| Styrene | 25 |
| n-Butyllithium | 0.11 |
| Temperature, °C | 70 |
| Time, minutes | 30 |
| Step 2 | |
| 1,3-Butadiene then added | 50 |
| Temperature, °C | 70 |
| Time, minutes | 30 |
| Step 3 | |
| $\epsilon$-Caprolactone then added | 0.3 |
| Temperature, °C | 70 decreased to 50 |
| Time, minutes | 10 approximately |
| Step 4 | |
| $\epsilon$-Caprolactone then added | 24.7 |
| Temperature, °C | 50 |
| Time, minutes | 30 |

At the completion of Step 4 in each instance, tri(2-methyl-1-aziridinyl)phosphine oxide was added to each polymerization mixture with the exception of that of Run 1. Each mixture was agitated thoroughly and then allowed to stand at about 25°C for about 20 minutes. Each mixture was then charged with a 10.3 weight percent solution of an antioxidant, 2,2'-methylenebis(4-methyl-6-tert-butylphenol) in toluene, with the amount of solution added being sufficient to provide about one part by weight of the antioxidant per 100 parts by weight of the total monomers charged. Each reaction mixture was then steam stripped to recover the polymer. Each polymer was then dried under vacuum at 60°C and was tested as follows, in which data the polyaziridinyl compound is indicated as "MAPO".

TABLE I

| Run No. | MAPO, mhm[a] | Conversion, Total Monomers (%) | Inherent Viscosity | Green Tensile, psi |
|---|---|---|---|---|
| 1 | 0 | 98 | 0.87 | 2007 |
| 2 | 0.6 | 100 | 0.86 | 2067 |
| 3 | 1.2 | 99 | 0.86 | 2143 |
| 4 | 1.8 | 98 | 0.96 | 2353 |
| 5 | 4.5 | 99 | 0.86 | 2767 |
| 6 | 9.0 | 99 | 0.91 | 2233 |

[a]mhm = gram millimoles per 100 grams of total monomers

Inherent viscosities were determined according to those procedures of U.S. Pat. No. 3,278,508, col. 20, notes $a$ and $b$, the polymers being gel-free.

The above data demonstrate that the method of this invention promotes the production of lactone block copolymers of high green tensile strength.

EXAMPLE II

Another series of runs was conducted using the recipe and procedure of Example I through Step 4 except that an 8 minute reaction time was employed in Step 4.

At the completion of Step 4 in each instance either 1,5-dichloropentane (DCP) or a triester, trimethylolpropane trimethacrylate (TMPTM), was employed in place of MAPO. The recovery procedure was the same as in Example I. The results of these runs are shown below in Table II.

TABLE II

| Run No. | Coupling Agent | (mhm) | Inherent Viscosity | Conversion, Total Monomers, % | Green Tensile, psi |
|---|---|---|---|---|---|
| 7 | 0 | | 0.94 | 98 | 2230 |
| 8 | DCP | 0.50 | 0.93 | 101 | 2410 |
| 9 | DCP | 1.00 | 0.94 | 101 | 2113 |
| 10 | DCP | 1.25 | 0.92 | 100 | 2423 |
| 11 | TMPTM | 0.25 | 0.93 | 100 | 2043 |
| 12 | TMPTM | 0.50 | 0.93 | 99 | 2173 |
| 13 | TMPTM | 0.75 | 0.95 | 99 | 2016 |

The results shown in Table II demonstrate that neither 1,5-dichloropentane nor trimethylolpropane trimethacrylate had any substantial effect in increasing the inherent viscosity or green tensile strength of the polymers compared to the control polymer (Run 7). It is thus evident that not all materials which might have been considered in the art to be coupling agents are effective to improve properties of the lactone containing polymers of this invention.

It will be evident from the foregoing that various modifications can be made to the method of this invention. However, such modifications are considered to be within the scope of the invention.

What is claimed is:

1. In a method of making a block copolymer by reacting a lactone monomer with a base polymer which is a polymer of a conjugated diene or a copolymer thereof with a vinyl aromatic compound, said base polymer having at least one $$(-\overset{|}{\underset{|}{C}} - alkali\ metal)$$

group; the improvement which comprises contacting a polyaziridinyl compound under reaction conditions with either (1) the base polymer and the lactone monomer being reacted or (2) the copolymer formed by reacting the base polymer with the lactone monomer, said polyaziridinyl compound having at least two

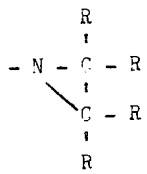

groups per molecule, wherein R is hydrogen, alkyl, aryl, cycloalkyl or a composite thereof, the total carbon atoms in said R groups being not greater than about 20.

2. The method of claim 1 in which said aziridinyl groups are contained in a polyaziridinyl compound in which said groups are attached to a carbon, phosphorous or sulfur atom.

3. The method of claim 1 in which the base polymer is prepared by use of an alkali metal initiator, and said polyaziridinyl compound is introduced in an amount within the range of from about 1 to about 0.5 to about 1 to about 50 equivalents of said alkali metal initiator to equivalents of aziridinyl groups in said polyaziridinyl compound.

4. The method of claim 1 in which said base polymer and said lactone monomer are contacted with said polyaziridinyl compound after said lactone monomer has been substantially completely polymerized.

5. The method of claim 4 in which tri(2-methyl-1-aziridinyl)-phosphine oxide is contacted with a polystyrene-polybutadiene base polymer which has been reacted with ε-caprolactone.

6. The method of claim 5 in which the base polymer is formed by polymerizing styrene in the presence of an organo-lithium initiator, after which 1,3-butadiene is added to form the base polymer.

7. The method of claim 1 in which said polyaziridinyl compound is selected from the group consisting of triaziridinyl-substituted triazines, triphosphatriazines containing from about 2 to about 6 aziridinyl-substituted rings, triaziridinylphosphine oxides and triaziridinylphosphine sulfides.

8. A copolymer prepared by the method of claim 1.

9. A method of producing a copolymer comprising polymerizing styrene by use of n-butyllithium as the initiator, thereafter adding 1,3-butadiene under conditions to polymerize the 1,3-butadiene, thereafter adding ε-caprolactam under conditions to polymerize the ε-caprolactone, and finally adding tri(2-methyl-1-aziridinyl)phosphine oxide under conditions to react said oxide with the material theretofore formed.

10. A copolymer prepared by the method of claim 9.

* * * * *

UNITED STATES PATENT OFFICE
CERTIFICATE OF CORRECTION

PATENT NO. : 3,880,955
DATED : April 29, 1975
INVENTOR(S) : Henry L. Hsieh and Ollie G. Buck It is certified that error appears in the above-identified patent and that said Letters Patent are hereby corrected as shown below:

Column 8, line 45, delete "$\epsilon$-caprolactam" and insert therefor --- $\epsilon$-caprolactone ---.

Signed and Sealed this fifth Day of August 1975

[SEAL]

Attest:

RUTH C. MASON
Attesting Officer

C. MARSHALL DANN
Commissioner of Patents and Trademarks